Oct. 15, 1963   R. E. PLANTE   3,107,323
VOLTAGE REGULATOR FOR GENERATORS
Filed Dec. 30, 1960   3 Sheets-Sheet 1
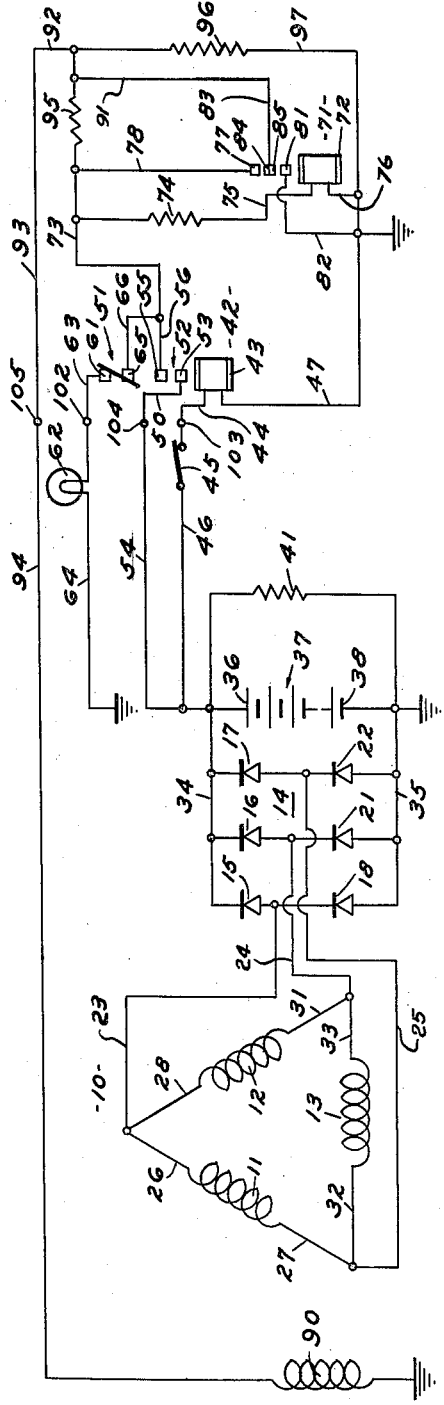
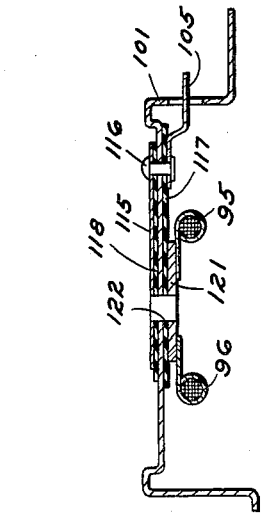
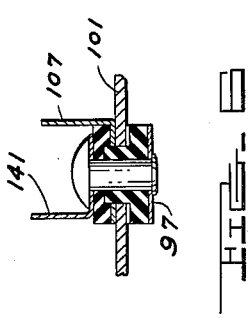
RAYMOND E. PLANTE
INVENTOR.
BY J. R. Faulkner
K. L. Zerschling
ATTORNEYS Oct. 15, 1963 R. E. PLANTE 3,107,323
VOLTAGE REGULATOR FOR GENERATORS
Filed Dec. 30, 1960 3 Sheets-Sheet 2
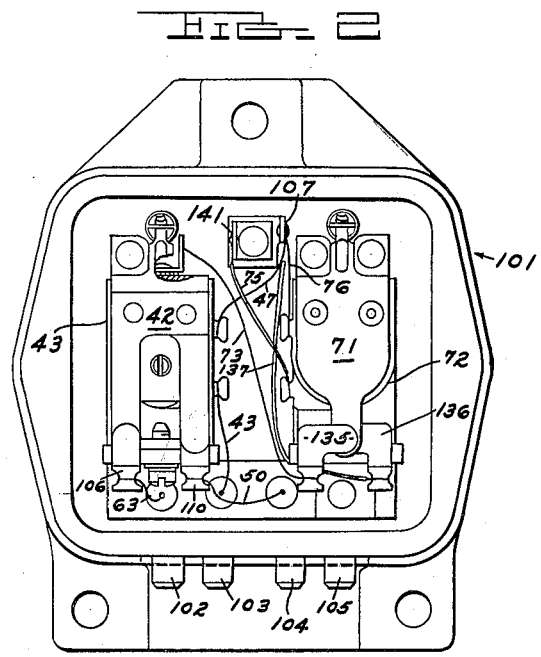
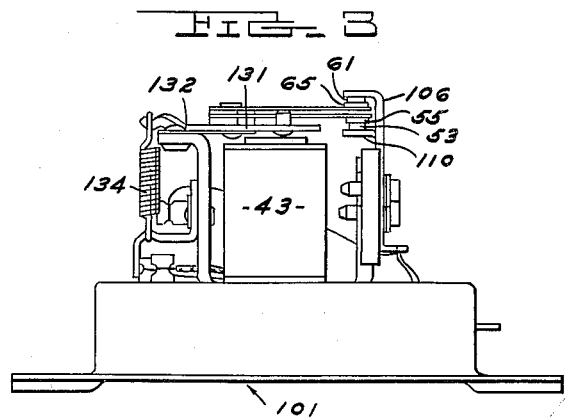
RAYMOND E. PLANTE
INVENTOR.
BY J. R. Faulkner
K. L. Zerschling
ATTORNEYS Oct. 15, 1963 R. E. PLANTE 3,107,323
VOLTAGE REGULATOR FOR GENERATORS
Filed Dec. 30, 1960 3 Sheets-Sheet 3
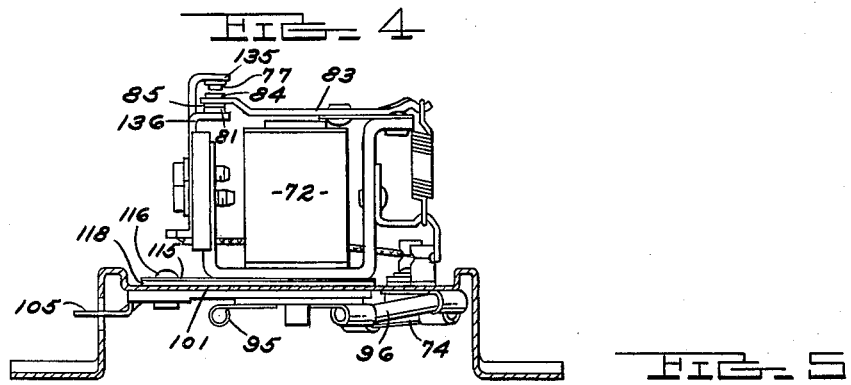
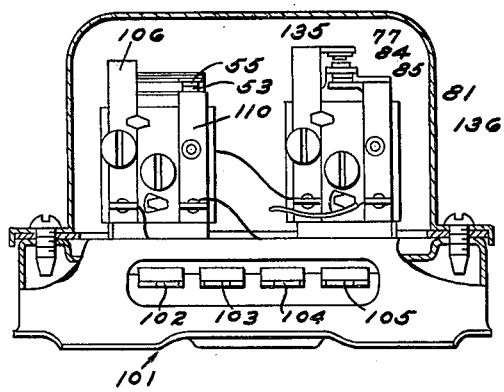
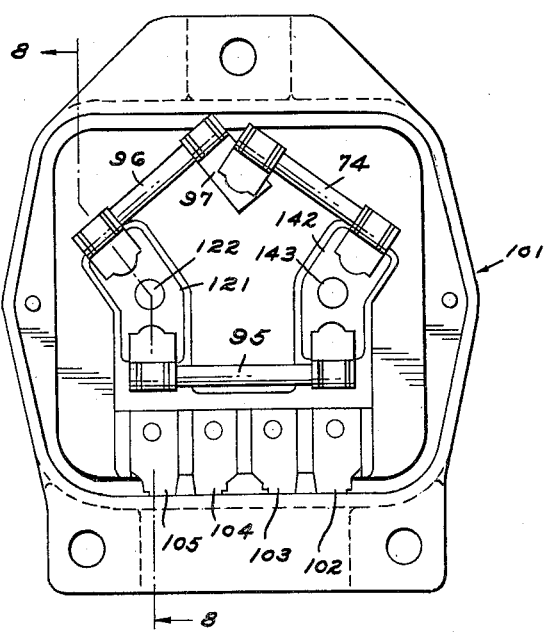
RAYMOND E. PLANTE
INVENTOR.
BY J. R. Faulkner
K. L. Zerschling
ATTORNEYS

United States Patent Office 3,107,323
Patented Oct. 15, 1963

3,107,323
VOLTAGE REGULATOR FOR GENERATORS
Raymond E. Plante, Detroit, Mich., assignor to Ford Motor Company, Dearborn, Mich., a corporation of Delaware
Filed Dec. 30, 1960, Ser. No. 79,821
4 Claims. (Cl. 320—40)

This invention relates to an electrical generating system including an alternator that may be employed in an automotive vehicle and more particularly to such a system in which a simplified electrical circuit is employed to energize the field winding of the alternator and to control an indicating means that indicates whether a storage battery connected to the alternator is being charged.

In the invention, an automotive vehicle alternator is provided that has output terminals and a field winding. A rectifier is connected across the output terminals to convert the alternating current output to direct current, and an electrical storage battery is connected across the terminals of the rectifier. A relay having a winding and two sets of contacts is connected in the circuit, with the winding being connectable to the storage battery through an ignition switch. One set of contacts is arranged to energize the field winding of the alternator when the ignition switch is turned on and the other set of contacts is normally closed and is arranged to energize an indicator lamp until such time as the alternator is producing sufficient electrical energy to charge the storage battery. In the preferred embodiment of the invention the first mentioned set of contacts energizes the field winding through a double contact voltage limiter.

This arrangement provides a compact and simplified circuit arrangement for energizing and controlling the field winding of an alternator and for indicating when the alternator is producing insufficient electrical energy to charge a storage battery.

An object of the present invention is the provision of an electrical system for an automotive vehicle that includes a simplified generating circuit for indicating when an alternator is producing insufficient electrical energy to charge a storage battery.

Another object of the invention is the provision of an electrical generating system for an automotive vehicle that includes a simplified electrical circuit for energizing the field winding of an alternator and for indicating when the alternator is producing insufficient electrical energy to charge an electrical storage battery.

Other objects and attendant advantages of the present invention will become more readily apparent as the specification is considered in connection with the attached drawings in which:

FIGURE 1 is a circuit diagram of the invention;
FIGURE 2 is a top plan view of a relay unit employed in the circuit shown in FIGURE 1;
FIGURE 3 is a left side view of the relay unit shown in FIGURE 1;
FIGURE 4 is a right side view of the relay unit shown in FIGURE 1;
FIGURE 5 is a front elevational view of the relay unit shown in FIGURE 1;
FIGURE 6 is a sectional view taken along the lines 6—6 in FIGURE 1;
FIGURE 7 is a bottom plan view of the base only of the relay unit shown in FIGURE 1; and,
FIGURE 8 is a sectional view taken along the lines 8—8 in FIGURE 7.

Referring now to the drawings in which like reference numerals designate like parts throughout the several views thereof, there is shown in FIGURE 1 a circuit diagram of the present invention in which an alternator suitable for use in an automotive vehicle is generally designated by the numeral 10. The alternator 10 may be a three phase alternator including three armature windings 11, 12 and 13 that are suitably connected to feed a rectifier 14 composed of diodes 15, 16, 17, 18, 21 and 22. These diodes are arranged in two groups, with each group containing three diodes and with the negative terminals of the first group, diodes 15, 16, 17, being connected to the positive terminals of the second group, diodes 18, 21 and 22, by means of leads 23, 24 and 25, respectively. The armature windings 11, 12 and 13 have end leads 26 and 27, 28 and 31, and 32 and 33, respectively, which are suitably connected together so that the end lead 26 from the winding 11 is connected with the end lead 28 of the winding 12. The end lead 31 of the winding 12 is connected with the end lead 33 of the winding 13 and the end lead 32 of the winding 13 is connected with the end lead 27 of the winding 11. The junction of end leads 26 and 28 is connected to the lead 23 joining diodes 15 and 18, the junction of leads 31 and 33 is connected to the lead 24 joining diodes 16 and 21, and the junction of leads 27 and 32 is connected to lead 25 joining diodes 17 and 22.

The positive terminals of the diodes 15, 16 and 17 are electrically connected to form the positive terminal 34 of the rectifier 14, while the negative terminals of diodes 18, 21 and 22 are connected to form the negative terminal 35 of the rectifier 14. The positive terminal 36 of a storage battery 37 is connected to the positive terminal 34 of the rectifier 14, while the negative terminal 38 of the storage battery which is grounded is connected to the negative terminal 35 of the rectifier. In this arrangement then, the storage battery 37 is connected across the terminals of the rectifier 14.

Connected in parallel with the storage battery 37 and the rectifier 14 is a load 41 which is intended to represent typical electrical equipment mounted on an automobile, including lights, cigar lighter, windshield wipers, etc. In this arrangement, the load can be operated directly from the battery or from the output from the rectifier when the alternator 10 is generating current.

It is to be understood that the illustration of the alternator 10 as delta connected is for illustrative purposes only and that a suitable Y connected alternator may also be employed. Similarly, it is to be understood that a positive ground system may also be employed rather than the negative system shown.

A relay generally designated by the numeral 42 is connected in circuit with the alternator, rectifier and storage battery. The relay 42 includes a winding 43 that is connected to the positive terminal 36 of the battery 37 and the positive terminal 34 of the rectifier 14 through a lead 44, an ignition switch 45 and a lead 46. The relay winding 43 is also connected to ground through a lead 47. The relay 42 includes two sets of contacts, one normally closed set designated by the numeral 51, and another normally open set designated by the numeral 52. The normally open set of contacts 52 includes a first contact 53 connected to the positive terminal 36 of the battery 37 and the positive terminal of the rectifier 14 through leads 50 and 54. The other contact of the normally open set of contacts 52 is designated by the numeral 55 and is carried on a first arm 56 of the armature of the relay.

A first contact 61 of the normally closed set of contacts 51 is connected to an indicator lamp 62 through a lead 63. The other terminal of the indicator lamp is connected to ground through a lead 64. The second contact 65 of the normally closed set of contacs 51 is carried on a second arm 66 of the armature of the relay 42.

The invention also includes a double contact voltage limiter relay generally designated by the numeral 71. This double contact voltage limiter relay includes a winding 72 that is connected to the armature of the relay 42 through a lead 73, a resistor 74 and a lead 75. The relay winding 72 is connected to ground through a lead 76.

The relay 71 also includes a first stationary contact 77 connected to lead 73 through lead 78 and a second stationary contact 81 connected to ground through a lead 82. An armature 83 having a contact 84 positioned on one side thereof for engagement with contact 77 and a second contact 85 positioned on the other side thereof for engagement with contact 81 is connected to the field winding 90 of the alternator through leads 91, 92, 93 and 94. A resistor 95 is positioned between the leads 78 and 91, the purpose of which will be described subsequently. Another resistor 96 is connected across the field winding 90 by having one end connected to the lead 92 and by having the other end connected to the ground through a lead 97.

The operation of the invention shown in FIGURE 1 will now be described. With the ignition switch 45 open, the normally closed contacts 51 will be closed and the normally open contacts 52 will be open, since the relay winding 44 will not at this point be energized. Under this condition, the alternator field winding 90 will not be energized since there is no connection between the battery and the field winding. Also, the armature 83 of the double contact voltage relay 71 will be positioned so that contacts 77 and 84 are in engagement.

When the operator of the automotive vehicle in which the present invention is mounted turns the ignition switch 45 to the closed position, the relay winding 43 is energized from the battery 37. This closes the normally open contacts 52, but the normally closed contacts 51 remain closed until such time as the alternator provides sufficient electrical energy to charge the battery. With the normally open contacts 52 closed, the alternator field winding 90 is energized from the battery 37 through the lead 54, contact 53, contact 55, the arm 56, lead 73, lead 78, contacts 77 and 84, armature 83, and leads 91, 92, 93 and 94. Under these circumstances, the indicator light 62 is also energized from the battery 37 through the lead 54, contact 53, contact 55, arm 56, arm 66, closed contacts 61 and 65, and lead 63.

The relay 42 is constructed and arranged so that when the alternator 10 produces sufficient output voltage to charge the battery 37, the normally closed contacts will open due to the magnitude of the current flowing through the winding 43. This breaks the engagement between contacts 65 and 61 and this breaks the circuit to the indicator lamp 62, thereby extinguishing it. Thus, under these circumstances the relay 42 provides a means for energizing the field winding 90 of the alternator and simultaneously giving an indication as to when the alternator is producing insufficient electrical energy to charge the battery 37.

When the output of the alternator reaches a selected level, the armature 83 of the double contact voltage limiter relay 71 vibrates between the position shown in the drawings and the position described previously in which the contacts 77 and 84 are in engagement. With the contacts in the open position, as shown in the drawing, the field winding 90 is energized from the battery 37 through the lead 54, contacts 53 and 55, lead 73, resistor 95 and leads 92, 93 and 94. This reduces the amount of current flowing through the field winding 90 due to the resistance of the resistor 95. This, in turn, reduces the output voltage from the alternator and the current flowing through the winding 72 of the double contact voltage limiter 71. This causes the armature 83 to again assume the position where the contacts 77 and 84 are in engagement. This cycle repeats many times a second with the armature 83 vibrating between the open position shown in the drawings and the position in which the contacts 77 and 84 are in engagement.

When a higher selected alternator voltage output is reached at higher speeds, the armature 83 vibrates between the open position shown in the drawings and the position in which the contacts 81 and 85 are in engagement. With the contacts 81 and 85 in engagement, the field is no longer energized from the battery 37 but is short-circuited with one end connected to ground, as shown in the left portion of the drawing, and with the other end connected to ground through the lead 94, lead 93, lead 92, lead 91, armature 83, contacts 85 and 81, and lead 82. The resistor 96 is in this case effectively positioned across the field winding 90 to absorb the inductive kick occasioned by the short-circuiting. This, of course, deenergizes the field winding and reduces the voltage output of the alternator. When this occurs, the current through the winding 72 of the relay 71 reduces to the point where the armature 83 again assumes the open position as shown in the drawing. This cycle also will repeat many times per second and will cause a vibratory motion of the armature between the position shown in the drawings and the position in which the contacts 81 and 85 are in engagement.

Referring now to FIGURES 2 through 8, there is shown a base member 101 having relays 42 and 71 mounted thereon. The base plate 101 carries a plurality of terminals designated by the numerals 102, 103, 104 and 105.

The terminal 102 is connected, in the external circuit, to the lamp 62, as shown in FIGURE 1. The terminal 102 is also connected to the lead 63 that in turn is connected to post 106 that carries contact 51.

The terminal 103 is connected, in the external circuit, to the ignition switch 45 as shown in FIGURE 1. It is also connected to lead 43 that connects the relay winding 44 to the terminal. The relay winding 44 is connected to a terminal 107 through the lead 47. This terminal 107 is connected to the base plate 101 or ground, as shown in FIGURE 6.

The terminal 104 is connected to the battery in the external circuit, as shown in FIGURE 1, and is also connected through the lead 50 to a post 110 mounted on base 101. The post 110 carries the contact 53, as shown in FIGURES 3 and 5.

The terminal 105 is connected, in the external circuit, with the field winding 90 through the lead 94 as shown in FIGURE 1. Within the base 110, it connects to the field resistor 96 and the resistor 95 by means of the structure shown in FIGURE 8. Here the field terminal 105 is connected to a strip of metal 115 through a rivet 116. The base 101 is insulated from the field terminal 105 and the strip of metal 115 by means of a pair of insulating strips 117 and 118. The strip of metal 115 is connected to an oblong strip of metal 121 through a rivet that may be placed in aperture 122. The strip of metal 121 is in turn connected to one end of the field resistor. The other end of the field resistor 96 is grounded to the metal case 101 through a bar conductor that has been shown schematically in FIGURE 1 by the numeral 97.

The two arms 56 and 66 of the relay 42 are carried on a bar 131 that lies over the relay winding 44. The bar 131 is pivotally mounted at 132 and is biased upwardly by the spring 134. This bar is in electrical contact with the two arms 56 and 66 and with the two contacts 55 and 65. It is connected to a post 135 that carries the contact 77 of the double contact voltage limiter relay 71 by means of a lead designated 73. The bottom contact of the relay 71, designated by the numeral 81, is carried by a post 136 that is connected to the ground connection 107 by means of a lead 137. The field winding 72 of the relay 71 is connected to the ground terminal 107 through the lead 76. It is also connected to a terminal 141 through the lead 75. This terminal connects with the resistor 74 as shown in FIGURES 6 and 7. The other end of the resistor 74 is connected to a metal plate 142 that is connected to the metal post 135 of the relay 71 by a rivet 143. The post 135, as previously stated, is connected to the armature of the relay 42 through the lead 73.

The armature 83 of the relay 71 is connected to the field terminal through the support member 151, the strip of metal 115 and rivet 116.

The resistor 95 is connected at one end to the resistor 74 through the plate 142 and it is connected at the other end to the resistor 95 through the plate 121.

The structure shown in FIGURES 2 through 8 is intended to illustrate one concrete embodiment of the relays 42 and 71 that may be employed within the circuit shown in FIGURE 1. It is to be understood, of course, that various other structures similar to this could also be employed in a circuit diagram of FIGURE 1.

Thus the present invention provides a regulating system for an automotive generator in which combined means are provided for energizing the field of the generator and for indicating when the generator is producing an output voltage insufficient to charge a storage battery.

It will be understood that the invention is not to be limited to the exact construction shown and described, but that various changes and modifications may be made without departing from the spirit and scope of the invention as defined in the appended claims.

I claim:

1. In an electrical generating system for an automotive vehicle, the combination comprising an alternator including output terminals and a field winding, a rectifier connected to said output terminals, an electrical storage battery connected across said rectifier, a relay including a winding, an ignition switch connected in series with said winding, said winding and ignition switch being connected in parallel with said rectifier and said storage battery, said relay including a pair of normally closed contacts and a pair of normally open contacts, an indicating lamp, said normally closed set of contacts connecting said rectifier and said storage battery to said indicating lamp, said normally open set of contacts connecting said battery and rectifier to said field winding through said ignition switch upon the closing of said ignition switch and the energization of the relay winding, said relay winding having a selected number of turns, the magnetic field created by current flow through said selected number of turns opening said normally closed set of contacts when the terminal voltage at the rectifier produced by the alternator exceeds the terminal voltage of the battery.

2. An electrical generating system for an automotive vehicle comprising, an alternator having a field winding and output terminals, a rectifier means connected across said output terminals, an electrical storage battery connected across said rectifier means, a relay having two sets of contacts and a winding, said winding having a selected number of turns, an ignition switch, said relay winding being connectable to said storage battery and said rectifier through said switch, one of said sets of contacts being closed by the magnetic field created by current flow through the selected number of turns of said winding when said ignition switch is closed and being connected to energize said field winding from said storage battery when said ignition switch is closed, an indicator lamp, the other set of contacts being connected to energize said indicator lamp only when the output voltage of said alternator is insufficient to charge said battery, said other set of contacts being opened by the magnetic field created by the current flow through the selected number of turns of said winding when the output voltage of the alternator exceeds the terminal voltage of the battery.

3. In an electrical generating system for an automotive vehicle, the combination comprising, an alternator including output terminals and a field winding, a rectifier connected to said output terminals, an electrical storage battery connected across said rectifier, a relay having two sets of contacts and a winding, said winding having a selected number of turns, an ignition switch, said relay winding being connectable to said storage battery and said rectifier through said switch, a voltage limiter, one of said sets of contacts being closed by the magnetic field created by current flow through the selected number of turns of said relay winding when said ignition switch is closed and being connected to energize said field winding from said storage battery through said voltage limiter when said ignition switch is closed, an indicator lamp, the other set of contacts being connected to energize said indicator lamp when the output voltage of said alternator is insufficient to charge said battery, said other set of contacts being opened by the magnetic field created by current flow through the selected number of turns of said winding when the output voltage of the alternator exceeds the terminal voltage of the battery.

4. In an electrical generating system for an automotive vehicle, the combination comprising an alternator including output terminals and a field winding, rectifier means connected to said output terminals, a storage battery connected across said rectifier means, an ignition switch, a relay including a relay winding connectable to said storage battery and said rectifier means through said ignition switch, said relay having a conductive armature, said conductive armature including a bar positioned over said winding, a first arm and a second arm supported in spaced relationship by said bar, a first contact supported on said first arm and a second contact supported on said second arm, said relay having a third contact positioned to be engaged by said first contact and a fourth contact positioned to be engaged by said second contact, a warning lamp connected to said fourth contact, said third contact being connected to said storage battery and said rectifier means, said conductive armature being connected to said field winding of said alternator, spring means engaging said armature for biasing said first and said third contacts out of engagement and said second and said fourth contacts into engagement, said relay winding having a selected number of turns, the current flow through said selected number of turns creating a magnetic field to bring said first and third contacts into engagement when said ignition switch is closed, but not to break the engagement of said second and fourth contacts whereby said field winding and said warning lamp are energized, the current flow through said selected number of turns of said relay winding creating a magnetic field to break the engagement of said second and said fourth contacts when the output voltage of the alternator exceeds the terminal voltage of the battery whereby said warning lamp is extinguished.

References Cited in the file of this patent
UNITED STATES PATENTS
2,774,842    Shrader _____ Dec. 18, 1956